No. 880,755. PATENTED MAR. 3, 1908.
E. L. PERRY.
METHOD OF TESTING TUBULAR BODIES.
APPLICATION FILED APR. 1, 1907.
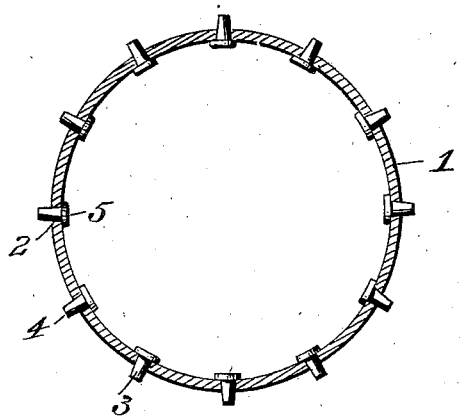
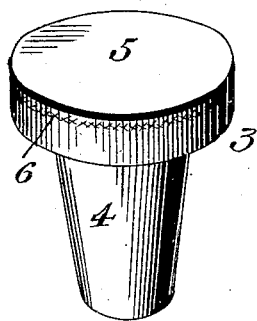 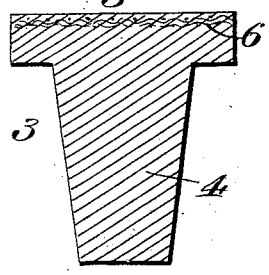
WITNESSES:
M. E. Moore
Wm. D. Coombs
INVENTOR
Edward L. Perry,
BY Chas. N. Fowler.
Attorney

UNITED STATES PATENT OFFICE.

EDWARD L. PERRY, OF PATERSON, NEW JERSEY.

METHOD OF TESTING TUBULAR BODIES.

No. 880,755.     Specification of Letters Patent.     Patented March 3, 1908.

Application filed April 1, 1907. Serial No. 365,692.

*To all whom it may concern:*

Be it known that I, EDWARD L. PERRY, a citizen of the United States, residing at Paterson, in the county of Passaic and State of New Jersey, having invented certain new and useful Improvements in Methods of Testing Tubular Bodies, and do hereby declare that the following is a full, clear, and exact description of the same, reference being had to the annexed drawings, making a part of this specification, and to the letters and figures of reference marked thereon.

The present invention has relation to the method of testing small or large tubes, such as gas or water mains, in order to show any defects in their manufacture, such as weak spots in the riveting or corking, or defective iron plate.

All tubes of the above character are required to be tested up to a certain pressure by the manufacturer, in order to detect any defects in the same, and the present mode of preparing the tubes for these tests is very expensive, unreliable and unsatisfactory. The present method consists substantially in sealing both ends of the pipe and all openings in the same so as to prevent the escape of water or air when under pressure. This was accomplished by means of a face-plate with a circular gasket attached, at each end of the tube to be tested, these plates being brought into contact with the ends of the pipe in such a manner that the said gaskets will make a water and air-tight joint on the ends of the pipe. The great trouble existing, however, is to stop up or pack the open rivet holes about both ends of the pipe. Many devices have been tried with unsatisfactory results, owing to the difficulty of so packing or stopping up these holes as to render them air or water tight while the fluid is being forced into the tube or pipe in testing it.

By the employment of my method the open rivet holes in the pipe are perfectly closed, and the greater the pressure the tighter the said openings will be packed. I employ an elastic tapered testing plug, which I have found to overcome all objections and to make a perfectly air and water tight joint. In order to reinforce the rivet the head is provided with a strengthening member, of fabric, duck or the like, molded thereinto. After the test has been completed the elastic plugs or rivets can be taken out and used over and over again until worn out, thereby saving great expense, time, and labor.

Other objects and advantages of the invention will hereinafter appear, and the novel features thereof will be particularly pointed out in the appended claim.

The invention will be clearly understood from the accompanying drawings, which, with the numerals of reference marked thereon, form a part of this specification and in which Figure 1 is a cross section through a pipe showing the rivet holes stopped or packed by my improved elastic testing plug. Fig. 2 is an enlarged perspective view of one of the plugs. Fig. 3 is a substantially central longitudinal section through the plug.

Like numerals of reference indicate like parts where they appear in the several views.

Referring now to the drawings 1 designates a tube or pipe which it is desired to test, the same being shown in cross section as the same is sufficient for the illustration of the present invention. When testing such tube or section of a pipe, all of the rivet holes 2 therein have to be sealed up perfectly tight, so as to withstand any pressure put upon the section or pipe when under test; and for this purpose I employ an elastic testing plug 3 which has a tapered body portion 4 adapted to enter the rivet hole from the interior of the pipe or section, and by reason of this interior application it becomes more tightly wedged into the rivet hole as the pressure increases. This plug has a head 5 of materially greater diameter than the rivet hole with which it is to be used, as will be evident from Fig. 1, in order that the plug may not be forced entirely through the hole. In order to enable the plug and the head thereof to better withstand the pressure to which the tube may be subjected, and to insure that the plug shall not be forced entirely through the hole by pressure, it being understood that the head is made of elastic material the same as the body portion, I mold or embed in such head one or more plies or thicknesses of cotton duck or other suitable fibrous material in or upon the outer surface of the head as seen at 6.

Preparatory to a test, all of the rivet holes in the pipe having been plugged from the interior by my improved elastic testing plug, pressure is applied in the usual way and the greater the pressure the more forcibly and securely will the plugs be pressed into the holes so as to render them each and all absolutely fluid-tight, and as the pressure is uniform throughout, the plugs will be forced outward through the holes each with the same degree of force or pressure.

It is evident that the plugs may be forced outward through the openings by any suitable means, and that the plugs may be made of varying sizes to adapt them for use with different sized holes.

What I claim as new is:—

The method of testing tubular bodies of rigid non-yielding material which comprises applying a plurality of tapered headed elastic testing plugs from the interior of said body, and forcing the same outward with the same degree of force to close the openings fluid-tight by said solid plugs solely by the pressure of the testing fluid within the tubular body.

In testimony whereof I affix my signature in presence of two witnesses.

EDWARD L. PERRY.

Witnesses:
FRANK G. LOZIER,
W. F. ZAMEGG.